No. 712,836. Patented Nov. 4, 1902.
C. P. MOSHER.
LIQUID MEASURING PUMP.
(Application filed Nov. 1, 1901.)
(No Model.) 2 Sheets—Sheet 1.
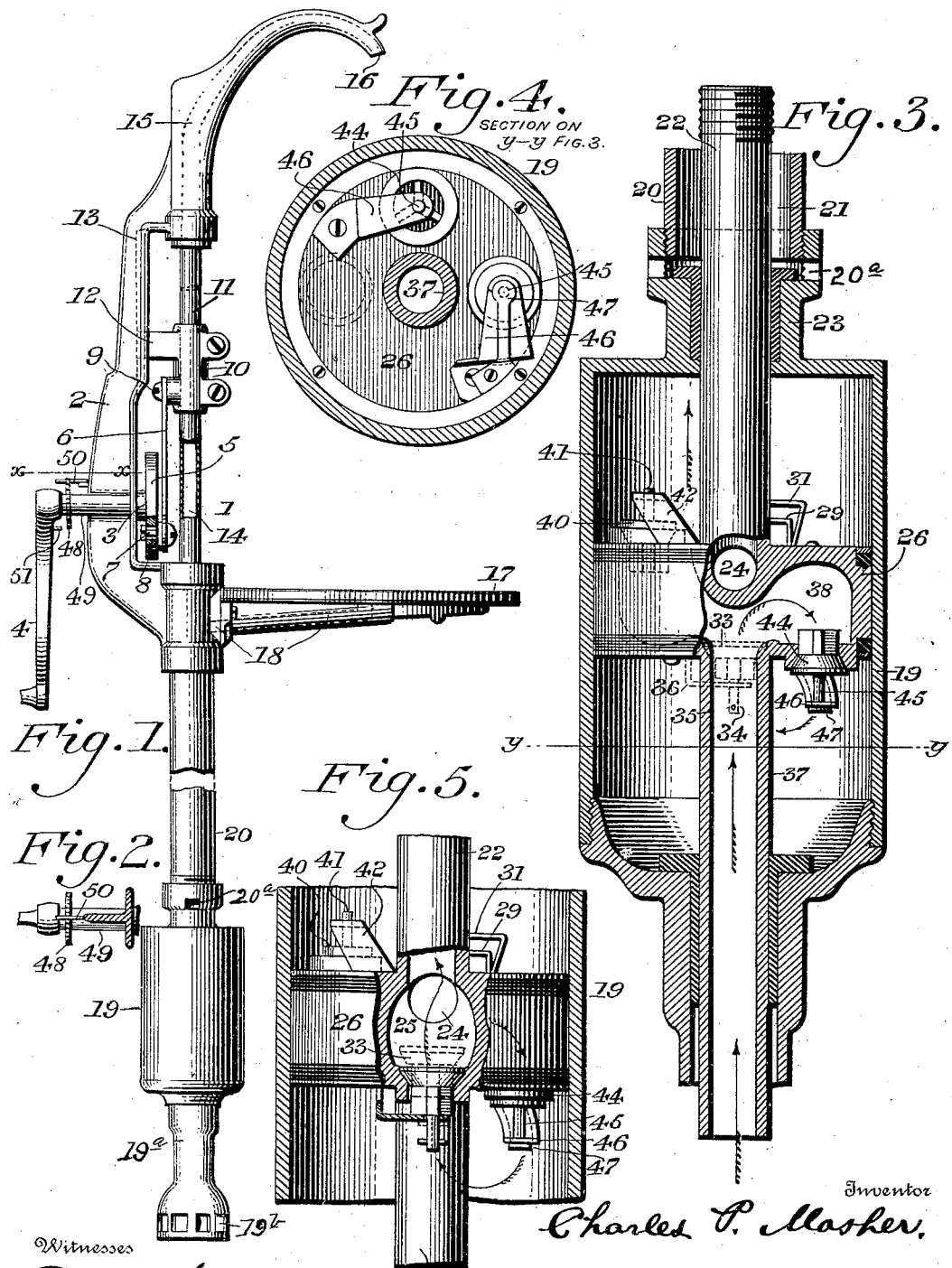

No. 712,836. Patented Nov. 4, 1902.
C. P. MOSHER.
LIQUID MEASURING PUMP.
(Application filed Nov. 1, 1901.)
(No Model.) 2 Sheets—Sheet 2.
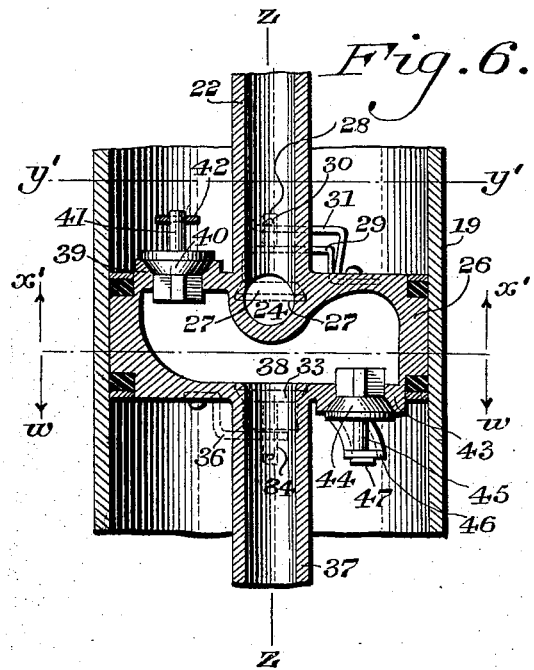
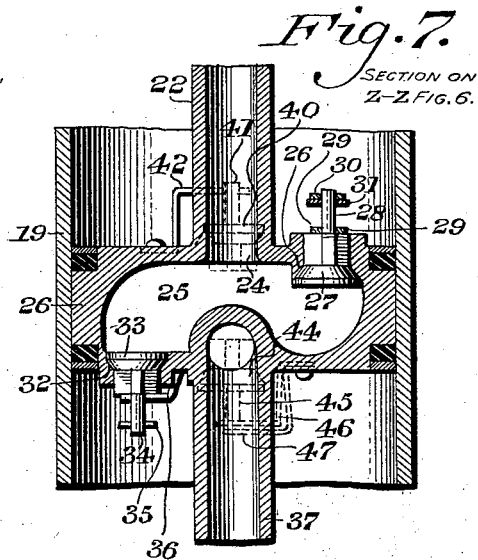
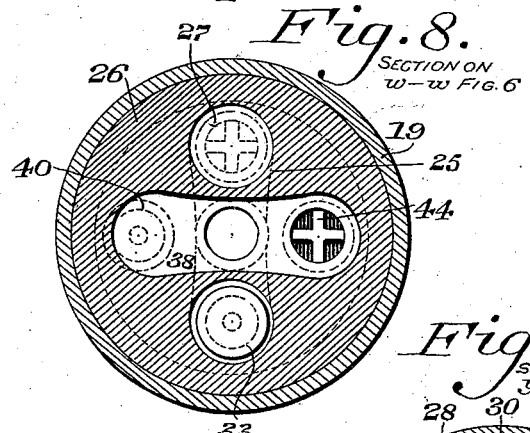
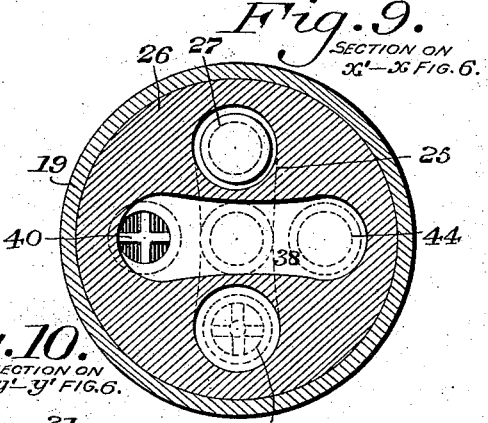
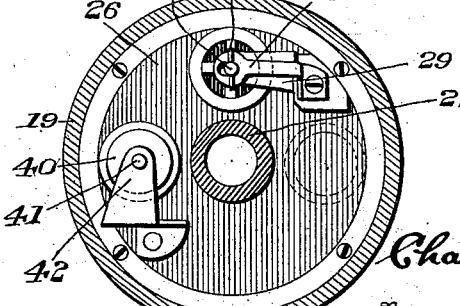
Witnesses
Inventor
Charles P. Mosher.
By Wiedersheim Fairbanks
Attorneys

UNITED STATES PATENT OFFICE.

CHARLES P. MOSHER, OF PHILADELPHIA, PENNSYLVANIA.

LIQUID-MEASURING PUMP.

SPECIFICATION forming part of Letters Patent No. 712,836, dated November 4, 1902.

Application filed November 1, 1901. Serial No. 80,737. (No model.)

*To all whom it may concern:*

Be it known that I, CHARLES P. MOSHER, a citizen of the United States, residing in the city and county of Philadelphia, State of Pennsylvania, have invented a new and useful Improvement in Liquid-Measuring Pumps, of which the following is a specification.

My invention consists of a novel construction of a liquid-measuring pump wherein provision is made for positively measuring the quantity of liquid pumped by each reciprocation of the plunger employed, means being also provided for regulating or varying the quantity measured according to requirements.

It also consists of a novel construction of pump-plunger, valves, and their adjuncts.

It also consists of the novel construction of pump-plunger, its intake and outlet, and the manner of locating and supporting the plunger-valves.

It further consists of novel details of construction, all as will be hereinafter fully set forth, and particularly pointed out in the claims.

Figure 1 represents a side elevation, partly in section, of a liquid-measuring pump embodying my invention. Fig. 2 represents a section on line $xx$, Fig. 1. Fig. 3 represents, on an enlarged scale, a sectional view of the pump-cylinder, showing partly in section and partly in elevation the pump-plunger, valves, and their adjuncts. Fig. 4 represents a section on line $yy$, Fig. 3. Fig. 5 represents a sectional view of the pump-cylinder shown in Fig. 3, showing also the plunger therefor partly broken away. Fig. 6 represents a vertical sectional view of the pump-cylinder, plunger, and their adjuncts. Fig. 7 represents a section on line $zz$, Fig. 6. Fig. 8 represents a section on line $ww$, Fig. 6. Fig. 9 represents a section on line $x'x'$, Fig. 6. Fig. 10 represents a section on line $y'y'$, Fig. 6.

Similar numerals of reference indicate corresponding parts in the figures.

Referring to the drawings, 1 designates my improved liquid-measuring pump, the same consisting of the body portion or housing 2, which has mounted therein in suitable bearings the rotary shaft 3, which latter is adapted to be turned by the crank 4 or other suitable or equivalent means.

5 designates a crank-wheel mounted on the shaft 3, to which is adjustably connected one end of the link 6 by means of the connection 7, which latter may be a bolt, stud, screw, or other equivalent device, said connection 7 being mounted in the slot 8, whereby the stroke of the link 6 can be adjusted according to requirements. The upper end of the link 6 is attached at 9 to a suitable portion of a sleeve or coupling 10, which is secured to the hollow reciprocating tube 11, said coupling having projecting therefrom a guide 12, which reciprocates in suitable ways 13 in the body portion 2. The tube 11 has a passage 14 therethrough which leads to the discharge-passage 15, from whose nozzle 16 the liquid to be pumped and measured is discharged.

17 designates a plate upon which the pail or other receptacle for the liquid to be pumped is supported, said plate or arm 17 having the passage 18 communicating therewith, whereby any overflow will be returned to the pump-cylinder 19, the latter being provided with depending portion 19$^a$, having inlet-perforations 19$^b$ and supported below the body portion or frame 2 by means of the intervening pipe or other connection 20, it being apparent from Fig. 3 that an annular passage 21 exists between the outer pipe 20 and the outlet-tube 22, which is suitably coupled or connected to the discharge-tube 11 and having outlet 20$^a$, as seen in Figs. 1 and 3.

23 designates a suitable packing or gland, within which the outlet-tube 22 reciprocates, the lower extremity of said outlet-tube communicating by means of a port 24 with the laterally-extending upper passage 25 within the pump-plunger 26, the detail construction of which latter will be best understood from an inspection of Figs. 4 to 10, inclusive.

As will be understood from an inspection of Fig. 7, the passage 25 is provided with a valve-seat 26 on its upper portion, against which is adapted to contact the valve 27, said valve being provided with the valve-stem 28, which passes through the guide 29 and has passing through its upper extremity the pin 30, against the under side of which bears the free end of the spring 31, whereby the upwardly-seating valve 27 is normally always retained against its seat, as will be understood from Figs. 6 and 7.

The passage 25 is provided on its under side with a valve-seat 32, against which the valve 33 is adapted to seat downwardly, said valve being provided with the stem 34, having the pin 35 passing therethrough, said stem being guided in the arm 36, it being apparent that said valve 33 normally tends to remain seated by reason of its gravity.

It will be understood that the foregoing description relates to the outlet-passage 25 in the pump-plunger 26 and to the arrangement of the coacting valves 27 and 33 therein, it being apparent that the construction is such that said valves normally are retained against their seat, as will be apparent to those skilled in this art from an inspection of Fig. 7, said passage 25 communicating with the outlet-tube 22, as is evident.

Referring especially now to Fig. 6, it will be seen that the intake 37 permits the liquid to pass therefrom into the passage 38, which extends laterally of the plunger 26 and in the present instance at substantially a right angle to the passage 25, hereinabove described. The passage or chamber 38 has a valve-seat 39, upon which is supported the valve 40, the latter being provided with the valve-stem 41, which passes through the arm or guide 42, as will be understood from Figs. 6 and 10, it being noted that said valve 40 is normally retained against its seat by the force of gravity. In the lower portion of the passage or chamber 38 is located the valve-seat 43, against which the valve 44 is adapted to contact, said valve, as will be apparent from the lower right-hand portion of Fig. 6, being normally adapted to be unseated by its own weight and being provided with a stem 45, which passes through the guide 46, said stem having bearing upon its extremity the free end of the spring 47, it being apparent that the valves 40 and 44 control the flow of the liquid in the suction or intake passage or chamber 38, and as their operation will be familiar to those skilled in this art any further detail description thereof is believed to be unnecessary.

In the left-hand portion of Fig. 1 and in Fig. 2 I have shown a form of registering device which may be employed, the same consisting of notched disk or ratchet wheel 48, which is mounted on the extension 49 and provided with teeth on the exterior periphery thereof, said teeth being normally engaged by the resilient pawl 50, which projects from the body or housing 2, said pawl being of such length that its extremity is adapted to contact with the pin 51, which is mounted on the handle 4, it being understood that the disk 48 is normally held in a stationary position upon the extension 49 by means of the pawl, but that when the extremity of said pawl contacts with the pin 51, as it must during each revolution of the handle 4, the disk 48 will be turned a distance equal to one notch, and by reason of the resiliency of the pawl 50 the same will be restored to the position seen in Fig. 2 after the pin 5 has passed it, it being understood that the disk 48 is mounted on the extension 49 with sufficient frictional contact therein so it cannot readily be rotated until the pin 51 contacts with the pawl 50.

The operation is as follows: The rotation of the shaft 3 and the crank-disk 5 through the medium of the link 6 will cause the tube 11 to reciprocate, the upper extremity of the latter entering the bore of the passage 15. Since the tube 11 is connected with the outlet-tube 22, it will be apparent that said tubes 11 and 22 will reciprocate in unison with each other and with them the plunger 26. It will be apparent that the plunger 26 in reality consists of a plurality of hollow pistons, the lower one of which conveys the liquid from the intake through the proper passages and valves in the plunger 26 and thence into the cylinder, while the upper piston in said plunger conveys the liquid to the discharge-outlet, it being apparent that since both are of the same diameter both ends of the cylinder must be equal and the amount of liquid pumped into and out of each end must be the same, it being further apparent that said hollow pistons are each provided with a series of valves, two on the upper side and two on the lower side of the plunger, one of said valves on said upper side and one on said lower side opening in unison and the opposite valves carried by said plunger closing in unison when said plunger is working.

It will be apparent that by the employment of the construction seen in Figs. 1 and 3 the inner pipe 11 conveys the liquid to the discharge-nozzle 16 of the pipe, while the outer pipe 20 conveys the liquid back into the barrel or receptacle from which the liquid is pumped.

By the employment of the link and the adjustable connections for the lower end thereof with the crank-wheel it will be seen that a variable crank throw is provided, whereby the amount of the liquid pumped can be regulated. By the employment of the registering device seen in Figs. 1 and 2 it will be seen that the serrated disk is moved one notch at each revolution of the crank-disk, the registering device also indicating the amount of the liquid drawn from the barrel or receptacle.

It will be apparent from the foregoing that my invention is a continuous-stream or double-action pump and that by the construction employed the pump is complete in itself and can be readily placed in position and operated without necessitating the employment of skilled labor.

It will be evident that various changes may be made by those skilled in the art which will come within the scope of my invention, and I do not, therefore, desire to be limited in every instance to the exact construction herein shown and described.

Having thus described my invention, what I claim as new, and desire to secure by Letters Patent, is—

1. In a liquid-measuring pump, the pump-cylinder, the plunger therein provided with upper and lower hollow extensions, said hollows constituting the intake and discharge openings respectively, and lateral passages in direct communication with, and upon each side of, the intake and discharge openings respectively, and lateral ports in each lateral passage communicating with the opposite sides of the piston respectively.

2. In a liquid-measuring pump, the pump-cylinder, the plunger therein provided with upper and lower hollow extensions, said hollows constituting the intake and discharge openings respectively, and lateral passages in direct communication with, and upon each side of, the intake and discharge openings respectively, lateral ports in each lateral passage communicating with the opposite sides of the piston respectively, and oppositely-seating valves at opposite ends of the lateral passages.

3. In a liquid-measuring pump, a body portion or housing, a discharge-outlet in the upper part of said body portion, an inner tube guided in said body portion and having its upper extremity opening into said discharge-outlet, means for reciprocating said inner tube, an outer tube surrounding said inner tube, a plate projecting from said outer tube and adapted to support the receptacle for the liquid pumped, and a drip-passage leading from said plate back to the interior of said outer tube.

4. In a liquid-measuring pump, a pump-cylinder, a plunger therein, a plurality of hollow extensions thereon, forming inlet and discharge passages, lateral passages at right angles to each other with a port from one to the inlet-passage and another from the other passage to the discharge-passage, valves at opposite ends of each lateral passage, a discharge-pipe connected to said plunger, a crank-wheel suitably supported, means for rotating said crank-wheel, a link having connections from said crank-wheel to said discharge-pipe and means for adjusting the crank throw so as to regulate the amount of liquid pumped.

5. In a liquid-measuring pump, the combination of a housing, an outer tube depending therefrom, a cylinder carried by said outer tube, a plunger contained within said cylinder, a plurality of hollow extensions in said plunger, lateral passages in direct communication with and upon each side of the said extensions, a series of valves for said extensions, one on the upper side and one on the lower side opening in unison, and the opposite two valves closing in unison during the reciprocations of the plunger, a discharge connection leading from said plunger and means for reciprocating the latter.

6. In a liquid-measuring pump, a cylinder, a plunger therein, means for reciprocating said plunger, a plurality of hollow extensions or passages in said plunger, one of said passages communicating with the intake and the other with the outlet for said plunger, lateral passages in direct communication with and upon each side of the intake and outlet passages, a valve in the upper portion of the passage communicating with the intake adapted to seat downwardly, a valve in the upper portion of the passage communicating with the outlet adapted to seat upwardly, and a valve in the lower portion of said last-mentioned passage adapted to seat downwardly and means for reciprocating said plunger.

7. In a liquid-measuring pump, a cylinder, a plunger therein, means for reciprocating said plunger, the latter consisting of a plurality of extensions or passages therein, arranged at angles to each other, one of said passages communicating with the outlet from said plunger, and the other of said passages communicating with the intake thereto and each extending upon opposite sides of said extensions, an upwardly-seating valve in the lower portion of the passage communicating with the intake, means for causing this valve to normally remain seated, a downwardly-seating valve in the upper portion of said passage communicating with said intake, guiding devices for said valve, a valve in the lower portion of the passage communicating with the outlet from said plunger, said valve being contained within said passage and adapted to seat downwardly, a valve contained in the upper portion of said last-mentioned passage communicating with said outlet and adapted to seat upwardly, and means for holding said valve against its seat.

8. In a device of the character described, a double pipe, one inside of the other, the inner one to convey the liquid to the discharge end of the pump, and the other one to convey the drip from the pan receiving the same, back into the barrel or receptacle from which the liquid is pumped.

CHARLES P. MOSHER.

Witnesses:
E. HAYWARD FAIRBANKS,
C. D. McVAY.